United States Patent [19]

Stewart et al.

[11] Patent Number: 4,518,570

[45] Date of Patent: May 21, 1985

[54] PROCESS FOR SEPARATING ANTIMONY FROM COLUMBIUM SOLUTIONS

[75] Inventors: Harvey Stewart, Newtown Square; C. Edward Mosheim, Hereford Township, Berks County, both of Pa.

[73] Assignee: Cabot Corporation, Boston, Mass.

[21] Appl. No.: 549,285

[22] Filed: Nov. 7, 1983

[51] Int. Cl.$^3$ .................. C01G 33/00; C01G 30/00
[52] U.S. Cl. .......................... 423/63; 423/87; 75/101 BE
[58] Field of Search ............... 423/63, 87; 75/101 BE

[56] References Cited

U.S. PATENT DOCUMENTS 2,767,047 10/1956 Wilhelm et al. ................. 423/63
2,795,481 6/1957 Hicks et al. ................. 423/63

OTHER PUBLICATIONS

West, "Metallurgical", Jun., 1956, pp. 292–294.
Stevenson et al., "Anal. Chemistry", vol. 25, 1953, pp. 1517–1519.

Primary Examiner—Herbert T. Carter
Attorney, Agent, or Firm—Robert J. Feltovic; Jack Schuman

[57] ABSTRACT

A process is disclosed for producing columbium solutions substantially free from antimony contamination. An aqueous columbium solution is contacted with an organic solvent to extract the antimony.

9 Claims, No Drawings

PROCESS FOR SEPARATING ANTIMONY FROM COLUMBIUM SOLUTIONS

Columbium-containing ores commonly are processed by digesting the ores in an acidic aqueous fluoride solution to solubilize the columbium (Cb) and tantalum (Ta) values from the ores. Much of the accompanying metallic impurities in the ores also dissolves along with the columbium and tantalum. The task of separation and purification of the columbium and tantalum from each other and from the other metallic impurities commonly is accomplished through liquid/liquid extraction techniques, using any suitable organic solvent, typically methyl isobutyl ketone (MiBK). The hydrofluoric acid digest solution is contacted with the ketone, and, under conditions of high acidity, both columbium and tantalum are transferred to the organic phase while other elements remain in the raffinate. When the organic extract is contacted with a low acidity solution, the columbium is preferentially back-extracted into the aqueous phase, leaving the tantalum in the organic phase.

In order to recover the columbium values from the aqueous phase, the columbium fraction, which essentially is an MiBK saturated aqueous solution of an oxyfluorocolumbic acid ($H_2CbOF_5$) and hydrogen fluoride (HF), typically has been treated with ammonia to precipitate columbium hydroxide ($Cb(OH)_5$), which then can be converted to columbium oxide ($Cb_2O_5$) by high temperature calcination techniques.

Most of the metallic impurities remain behind in the aqueous hydrofluoric acid digest solution. Antimony (Sb), however, is a notable exception. Much of the antimony contaminant, if present in the original ore, follows the columbium through the extraction-purification system, and still is present in the final columbium aqueous phase, the columbium fraction. When the columbium is recovered, by techniques such as precipitation and calcination, the antimony remains with the columbium as an impurity. The presence of this antimony is unsatisfactory for many columbium applications in industry.

Now, according to the present invention, a process has been discovered for separating antimony from columbium in an aqueous hydrofluoric acid solution. It has been found that antimony in its higher oxidation states can be extracted from a columbium solution having an acidity ranging from about 3N to about 10N by liquid/liquid extraction techniques using a suitable organic solvent.

It has been discovered that antimony in its higher oxidation states (that is, in the $Sb^{+4}$ and/or $Sb^{+5}$ valence states) exhibits a favorable distribution coefficient between an aqueous solution and a suitable organic solvent. Therefore, advantage can be taken of this property to extract the antimony into the organic solvent, while co-extracting only a portion of the columbium.

It further is theorized, however, that much of the antimony contaminant in a typical columbium fraction generally is present in its lower oxidation state (that is, in the $Sb^{+3}$ valence state). $Sb^{+3}$ has an unfavorable distribution coefficient of $Sb^{+3}$ between the aqueous fraction and the organic solvents into which antimony in its higher oxidation states can be extracted. It further has been discovered, however, that the addition of an oxidant to the aqueous solution containing $Sb^{+3}$ is effective in oxidizing the antimony to the $Sb^{+4}$ and/or $Sb^{+5}$ valence state, after which the oxidized antimony then can be successfully extracted using a suitable organic solvent as discussed above. Therefore, to ensure that substantially all of the antimony present in the aqueous solution is present in its higher oxidation states, it is preferred that a suitable oxidant be added that is effective to oxidize all of the antimony present to the $Sb^{+4}$ and/or $Sb^{+5}$ valence states.

The amount of oxidant that should be added to the aqueous columbium-containing hydrofluoric acid solution is determined by the amount of antimony contaminant in the $Sb^{+3}$ valence state present in the solution. In general, it is preferred to use at least about one equivalent amount of oxidant, per equivalent of antimony $Sb^{+3}$ contained in the solution to ensure that substantially all of the antimony is oxidized. Typically, the concentration of total antimony in the columbium fraction ranges up to about 0.3 g/L (kg/m$^3$), and the solution contains from about 80 to about 150 g/L (kg/m$^3$) of dissolved columbium, depending upon the source of the columbium-containing ore involved in the process. Although it is preferred to add the oxidant directly to the columbium fraction itself, alternatively, the oxidant can be added to the antimony-containing solution at any point in the overall ore extraction process prior to the organic solvent extraction purification of the columbium fraction. Depending on the point in the process at which the oxidant is added, the presence of other oxidizable impurities may influence the amount of oxidant added.

Any oxidant suitable to oxidize $Sb^{+3}$ may be used, including peroxides, permanganates, bromates, and the like. Peroxides, such as hydrogen peroxide, sodium peroxide, and barium peroxide are preferred. Hydrogen peroxide is particularly preferred.

The antimony in its higher oxidation states may be extracted from the aqueous columbium fraction using any suitable, water-immiscible, organic solvent. Typical solvents that may be used include ketones, alcohols, ethers, aldehydes, organic phosphates, and the like. Ketones, in particular methyl isobutyl ketone (MiBK), are preferred. A volume ratio of ketone to columbium fraction ranging from about 0.5:1 to about 2:1 has been found to provide advantageous results. MiBK in a ratio with columbium fraction of about 1:1 to about 1.5:1 has been found to be particularly preferred.

While antimony in its higher oxidation states exhibits a distribution coefficient favoring selective extraction of antimony into an organic solvent, some columbium also will be extracted along with the antimony from the aqueous solution into the organic phase. Accordingly, in a typical process scheme for practicing the subject invention, the most efficient separation will extract a maximum of the antimony while extracting a minimum of the columbium. Favorable extraction ratios can be adjusted by manipulating factors such as acidity level in the columbium solution and also the ratio of organic solvent to the columbium solution used. To facilitate the recovery of columbium extracted along with antimony in the extraction-purification system, the solvent containing the antimony and columbium can be recycled back to an appropriate step in the overall columbium extraction process. For example, in the process described, the antimony and columbium-containing solvent can be recycled back into the step where columbium-loaded ketone is stripped with water to produce the columbium fraction.

The acidity (normality, N) of the aqueous columbium solution should range from about 3N to about 10N. The acidity of a typical columbium fraction prepared as described above ranges from about 5N to about 9N. This acidity level has been found satisfactory for antimony extraction. Most favorable extraction of antimony, with minimized columbium extraction, has been accomplished from solutions having an acidity of from about 6N to about 8N, and this level of acidity is preferred.

The following examples are provided to further illustrate the invention. The examples are intended to be illustrative in nature and are not to be construed as limiting the scope of the invention.

EXAMPLE I

An ore digestion solution was prepared by digesting a columbium-tantalum ore with hydrofluoric acid to produce an aqueous columbium solution containing about 140 g/L (kg/m$^3$) Cb, and about 300 mg/L (0.3 kg/m$^3$) Sb. The acidity of the Cb fraction was 8.4N.

To this 0.350L (0.0035 m$^3$) aqueous columbium fraction was added 0.42 g (5×stoichiometric) of hydrogen peroxide. The Cb fraction was contacted counter-currently with methyl isobutyl ketone in 15 extraction stages (volume ratio of ketone to Cb fraction was 1.5:1). Following the extraction, the Cb fraction contained about 60 g/L (kg/m$^3$) Cb and only about 1 to 2 mg/L (0.001 to 0.002 kg/m$^3$) antimony.

EXAMPLE II

A sample of columbium fraction was prepared from the same ore digestion solution as in Example I, above. The acidity of the produced Cb fraction was 7.4N. In identical manner to Example I, this Cb fraction was treated with hydrogen peroxide and then contacted counter-currently with MiBK. Following the extraction, the columbium fraction had a columbium content of about 85 g/L (kg/m$^3$) and an antimony content of about 3 to 4 mg/L (0.003 to 0.004 kg/m$^3$).

EXAMPLE III

Another ore digestion solution was prepared by digesting a columbium-tantalum ore with hydrofluoric acid to produce a solution containing about 60 g/L (kg/m$^3$) Ta, about 60 g/L (kg/m$^3$) Cb, and about 0.8 g/L (kg/m$^3$) Sb. This digestion solution was treated in a manner similar to that described in Example I. The aqueous Cb fraction (acidity of 8.0N) had a columbium content of about 140 g/L (mg/m$^3$) and an antimony content of about 130–140 mg/L (0.13 to 0.14 kg/m$^3$).

Hydrogen peroxide (0.08 g/L (kg/m$^3$)) was added to 350 ml of the columbium fraction. The solution then was contacted counter-currently with methyl isobutyl ketone in 10 extraction stages with the volume ratio of ketone to Cb fraction being 1:1. The resulting Cb fraction had a columbium content of 70 g/L (kg/m$^2$) and an antimony content of 10–15 mg/L (0.010 to 0.015 kg/m$^3$).

EXAMPLE IV

Each of the columbium fractions produced in the above Examples I–III was treated by the addition of ammonia to precipitate columbium hydroxide (Cb(OH)$_5$), which was then calcined to produce Cb$_2$O$_5$. Each of the resulting Cb$_2$O$_5$ products contained less than 25 ppm Sb/Cb on a metal to metal basis. In comparison, columbium fractions prepared without the antimony removal treatment of the present invention contain greater than 1000 ppm Sb/Cb on a metal to metal basis.

The embodiments of the invention in which an exclusive property or privilege is claimed are defined as follows:

1. A process for removing antimony in the +4 and/or +5 valence states from a methyl isobutyl ketone saturated aqueous solution of oxyfluorocolumbic acid and hydrogen fluoride, comprising:

contacting, using liquid/liquid extraction techniques, the said aqueous solution having an acidity ranging from about 3N to about 10N with a water-immiscible, organic solvent selected from the group consisting of ketones, alcohols, ethers, aldehydes, and organic phosphates to extract the antimony from the solution into the organic solvent.

2. The process of claim 1 wherein the aqueous solution has an acidity ranging from about 5N to about 9N.

3. The process of claim 1 wherein said solution is contacted with a ketone to extract the antimony.

4. The process of claim 3 wherein said ketone is used in a volume ratio with the aqueous solution ranging from about 0.5:1 to about 2:1.

5. The process of claim 3 wherein said ketone is methyl isobutyl ketone.

6. The process of claim 5 wherein said methyl isobutyl ketone is used in a volume ratio with the aqueous solution ranging from about 1:1 to about 1.5:1.

7. The process of claim 1 wherein oxidant is added to said aqueous solution in an amount sufficient to oxidize substantially all of the antimony present to the Sb$^{+4}$ and/or Sb$^{+5}$ valence states.

8. The process of claim 7 wherein said oxidant is hydrogen peroxide.

9. The process of claim 7 wherein said oxidant is added in an amount of at least about one equivalent of oxidant per equivalent of antimony Sb$^{+3}$ contained in the solution.

* * * * *